UNITED STATES PATENT OFFICE.

CHRISTIAN ARENDT AND WILHELM HÖNICKE, OF BÜSUM, GERMANY.

METHOD OF OBTAINING EXTRACT OF SHRIMPS.

SPECIFICATION forming part of Letters Patent No. 662,849, dated November 27, 1900.

Application filed February 6, 1900. Serial No. 4,240. (No specimens.)

*To all whom it may concern:*

Be it known that we, CHRISTIAN ARENDT and WILHELM HÖNICKE, subjects of the King of Prussia, German Emperor, residing at Büsum, Holstein, in the Kingdom of Prussia and German Empire, have invented certain new and useful Improvements in Methods of Obtaining an Extract of Shrimps, (for which we have applied for a patent in Germany dated November 4, 1899,) of which the following is a specification.

The shrimps (prawns) are at the seaside a very valuable food, for which there is a great demand. However, the same are not fit for being transported over great distances, so that great quantities of this exquisite food are wasted at the seaside, because no use for the same can be found. Now our invention relates to a method of obtaining an extract of shrimps which is very well fitted for making this nutritive kind of food accessible to persons living far away from the sea. Therefore the main purpose of the present invention consists in producing an extract which contains the nutritive elements of the shrimps in a state as concentrated as possible and which is free from the fish-like taste which is peculiar to shrimps, so that the same, like different kinds of meat extracts, can be used in different manners.

The above-mentioned extract is obtained in the following way: The fresh and raw shrimps are squashed and then deprived of the greatest part of their fish-like taste and odor by washing them out with vinegar and afterward with pure well-water. Then for the sake of extracting the valuable nutritive elements the mass is heated to about 50° to 60° centigrade, and the broth obtained in this way is pressed out in a hot state. The thick juice which has been pressed out is then heated to 70° to 75° centigrade. Further, wood-shavings are added in order to clear the broth. The same wood-shavings are preferably prepared before use by boiling them in water which has been made slightly alkaline by means of soda. After the mass has been cleared and the wood-shavings removed the same is purified by filtration. The purified broth is then boiled in a steam-bath, and after evaporating half of the water contained therein it is filtrated again by means of pulverized clay, (infusorial earth or the like.) Then to the purified liquid is added a body composed of creatin and pepsin and the same completely boiled down at a low temperature in a vacuum. In this way a product is obtained which does not possess any fish-like taste and odor, but, on the contrary, has a very agreeable flavor. This product can be kept a long time and contains a very high percentage of protein, which latter, owing to the repeated boiling at a temperature as low as possible and the addition of the body composed of creatin and pepsin, is obtained in a very soluble state.

Having thus described our invention, what we claim, and desire to secure by Letters Patent, is—

1. A method of obtaining an extract of shrimps, prawns or the like, consisting in depriving the shrimps of their fish-like taste and odor by washing them in vinegar, further extracting the nutritive elements of same by means of warm water having a temperature of about 50° to 60° centigrade, then clearing the broth which has been pressed out by means of wood-shavings, filtrating the broth with pulverized clay, adding to the semiconcentrated mass a preparation of creatin and pepsin in order to augment the nutritive value of same, and boiling down the extract in a vacuum at as low a temperature as possible, substantially as described.

2. A method of obtaining an extract of shrimps, prawns or the like, consisting in depriving the shrimps of their fish-like taste and odor by washing them in vinegar and water, further extracting the nutritive elements of same by means of warm water having a temperature of about 50° to 60° centigrade, then clearing by means of wood-shavings the broth which has been pressed out, filtrating the latter with pulverized clay, adding to the semiconcentrated mass a preparation of creatin and pepsin in order to augment the nutritive value of same, and boiling down the extract in a vacuum at as low a temperature as possible, substantially as described.

3. A method of obtaining an extract of shrimps, prawns or the like, consisting in depriving the shrimps of their fish-like taste and odor by washing them in vinegar, further extracting the nutritive elements of same by means of warm water having a temperature of about 50° to 60° centigrade, then clearing by means of wood-shavings which have been previously heated with boiling water containing soda the broth which has been pressed out, filtrating the latter with pulverized clay, adding to the semiconcentrated mass a preparation of creatin and pepsin in order to augment the nutritive value of same, and boiling down the extract in a vacuum at as low a temperature as possible, substantially as described.

4. A method of obtaining an extract of shrimps, prawns or the like, consisting in depriving the shrimps of their fish-like taste and odor by washing them in vinegar and then in water, further extracting the nutritive elements of same by means of warm water having a temperature of about 50° to 60° centigrade, then clearing by means of wood-shavings which have been previously heated with boiling water containing soda the broth which has been pressed out, filtrating the latter with pulverized clay, adding to the semiconcentrated mass a preparation of creatin and pepsin in order to augment the nutritive value of same, and boiling down the extract in a vacuum at as low a temperature as possible, substantially as described.

In testimony whereof we have hereunto set our hands in the presence of two witnesses.

CHRISTIAN ARENDT.
WILHELM HÖNICKE.

Witnesses:
 E. H. L. MUMMENHOFF,
 AUGUST LÜHRS.